(12) United States Patent
Biswas

(10) Patent No.: US 9,123,182 B2
(45) Date of Patent: *Sep. 1, 2015

(54) ANIMATED PREVIEW OF IMAGES

(75) Inventor: Sanjeev Kumar Biswas, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 959 days.

This patent is subject to a terminal disclaimer.

(21) Appl. No.: 12/940,099

(22) Filed: Nov. 5, 2010

(65) Prior Publication Data

US 2014/0304657 A1  Oct. 9, 2014

Related U.S. Application Data

(63) Continuation of application No. 11/739,996, filed on Apr. 25, 2007, now Pat. No. 7,843,454.

(51) Int. Cl.
*G06T 13/80* (2011.01)
*G06T 13/00* (2011.01)

(52) U.S. Cl.
CPC ............... *G06T 13/80* (2013.01); *G06T 13/00* (2013.01); *G06T 2213/12* (2013.01)

(58) Field of Classification Search
USPC .......................................... 715/838; 704/247
See application file for complete search history.

(56) References Cited

U.S. PATENT DOCUMENTS

| | | | |
|---|---|---|---|
| 5,479,602 A | 12/1995 | Baecker et al. | |
| 2005/0234719 A1* | 10/2005 | Hosoda et al. | 704/247 |
| 2005/0259956 A1 | 11/2005 | Chen | |
| 2006/0129933 A1 | 6/2006 | Land et al. | |
| 2006/0184877 A1* | 8/2006 | Ohashi | 715/517 |
| 2006/0195876 A1 | 8/2006 | Calisa | |
| 2006/0253491 A1 | 11/2006 | Gokturk et al. | |
| 2007/0124325 A1 | 5/2007 | Moore et al. | |
| 2008/0034325 A1* | 2/2008 | Ording | 715/838 |
| 2008/0034381 A1* | 2/2008 | Jalon et al. | 719/329 |

OTHER PUBLICATIONS

Examiner Interview Summary dated Jun. 29, 2010 in parent U.S. Appl. No. 11/739,996.
Office Action dated May 12, 2010 in parent U.S. Appl. No. 11/739,996.
Notice of Allowance dated Jul. 26, 2010 in parent U.S. Appl. No. 11/739,996.
Office Action dated Oct. 29, 2009 in parent U.S. Appl. No. 11/739,996.
U.S. Appl. No. 11/739,996, filed Apr. 25, 2007.

* cited by examiner

*Primary Examiner* — Phi Hoang
(74) *Attorney, Agent, or Firm* — Kilpatrick Townsend & Stockton LLP

(57) ABSTRACT

Computer program products, methods, systems, etc. for generating an animated preview of a number of images are disclosed. A selection of a group of images is received. A set of digital images from the group of images are identified as being representative of the group. At least some portion of the identified set of representative digital images from the group is then used to create an animated image. The animated image serves as a preview of the group of images, such that, when a user browses the images and sees the preview associated with a corresponding folder or directory, the user is able to quickly and easily associate the images in the group with a particular event and identify contents of the folder or directory.

18 Claims, 9 Drawing Sheets

ANIMATED PREVIEW OF IMAGES

CROSS-REFERENCE TO RELATED APPLICATION

This application is a continuation of U.S. patent application Ser. No. 11/739,996 filed on Apr. 25, 2007, now allowed, the contents of which are incorporated herein by this reference.

BACKGROUND

Users take more photographs with digital cameras now than ever before. In the past, the two primary disadvantages to taking numerous photographs with digital cameras were a lack of inexpensive storage devices available, particularly if a user took many high resolution digital photographs, and high costs associated with printing the photographs on photo paper. Advances in storage technology have resulted in greater amounts of storage being sold at a lower cost, such that it is now possible for digital camera owners to purchase many gigabits of storage for a few hundred dollars, sometimes less. Further, a number of solutions are available for users to print out their own high quality paper photographs from the digital pictures they themselves took at home at a cost of pennies per print, without having to pay outrageous printing costs at a local photo laboratory or other photo processing center.

A number of software applications are available that allow a user to edit, share, and especially preview and navigate their digital images including digital photographs, wherever those digital images may be stored. Even operating systems, such as the Microsoft® Windows® family of operating systems includes an automatic preview of a folder containing digital images. Windows may be set to display up to four thumbnails of digital images contained within the folder on a folder icon, giving a user some idea of the types of images contained within the folder. Other applications may create previews in their own particular ways, such as showing a number of condensed-sized thumbnails of digital images contained within a particular folder.

SUMMARY

Conventional digital image preview generating technologies do not allow a user to quickly and easily view only a number of image previews that are very representative of the digital images contained within a folder, subfolder, or other location. As an example, take a family that recently returned from a ten day trip to the beach, during which they took thousands of digital photographs. The previews described above, such as the Windows® four thumbnail preview, will almost certainly not provide any information that allows the family to distinguish the pictures taken on the Friday of their trip with the pictures taken on the Sunday of their trip, for example. This remains true even if the family, when downloading images from their camera, separates the images into folders according to days, such that all images taken on Friday are in one folder, all images taken on Saturday are in another folder, and so on. Indeed, in such a situation, it may be the folder name, or the date created of the folder, that provides the family with a clue as to what beach images are contained therein, and not the four thumbnail preview or other preview.

Embodiments of the invention significantly overcome such problems by providing an animated preview of representative images taken from the totality of images. For example, a user selects some grouping of digital image files. A preview generator application is configured to generate animated previews based on the grouping, as described in greater detail herein. For example, the preview generator application then identifies those files in the grouping that are most representative of the grouping, such that, when a person familiar with the image files views the representative images, the person will be able to associate those images with a particular event. For example, if a person is able to view three images of hundreds of images taken during a birthday party, such as an image of a person blowing out candles on his birthday cake, the person will immediately know that the images in this grouping were taken during his birthday party, and as such, those images are representative of the grouping as a whole or that the snapshots were taken around the time of the birthday party. The preview generator application utilizes the selected, representative images (e.g., digital image snapshots) to create an animated preview. Such an animated preview of one or more images may be stored or created as one or more files such as an animated GIF file.

The representative images for display in the animated preview may be selected in any number of ways. For example, the preview generator application may be programmed to divide a grouping of images according to time, such as days, hours, or other segments of time. Alternatively, the user may input such ranges of time to the application. In another situation, the user may be presented with images from which to select representative images for inclusion in the animated preview. In a different situation, the preview generator application may iterate through the timestamps of the digital image files and determine the most optimal grouping of images through one or more processes as described herein.

Further, the types of animations that the preview generator application may create may vary. For example, in addition to creating an animated image file, such as an animated GIF file, the preview generator application may use a number of images within each frame of the animated file, and rotate through just those representative images. For example, the preview generator application may configure a preview window to sequentially display (e.g., one image at a time or multiple images at a time) each of multiple representative images for a duration of time so that a viewer may view each representative image in the same preview window. Alternatively, the preview generator application may rotate through various subsets of the images in a particular pattern.

In addition to still photos or snapshots, animated video files may also be created. Additionally, besides serving as a preview for the contents of a folder or folders contain image files, the animated preview created according to embodiments herein may be used to create box art, and other similar tangible items, for compilations of digital images, such as may be stored on a DVD-ROM or CD-ROM, or the like. Additionally, when a storage location such as a folder or directory has a preview created according to embodiments of the invention, the images in that folder or directory may be imported into an image application such as Adobe® Photoshop®. In such applications, the images may be arranged in a tree-like structure, where each leaf of a tree is a subgroup of images determined according to embodiments of the invention. A user clicking on a leaf would then be able to view images from just the sub-group that is represented by that leaf.

More particularly, in one embodiment, there is provided a method of generating an animated preview of a number of digital images. The method includes receiving a selection of a group of images; identifying a set of images from the group as being representative of the group; and creating an animated image to serve as a preview of the group. The animated image is configured to display the identified set of images for indicating attributes of content stored in a storage resource. The animated image may include a portion of the identified number of representative digital images from the group or a video clip representative of the contents of the respective folder.

In a related embodiment, the method may further include associating the animated image with the storage resource of a storage system that stores the group of images, and enabling play back of the animated image to provide an indication of the content stored in the storage resource. In a further related embodiment, the method may include configuring the animated image to sequentially display each image in the identified set of images, one after another over time, in a frame of a preview window associated with the storage resource when the storage resource is displayed on a display screen.

In another further related embodiment, the method may include configuring the animated image to repeatedly sequence through a temporary display of each image in the set of images in a preview window associated with the storage resource to provide a visual indication of the available content stored in the storage resource.

In another related embodiment, the method may further include configuring the animated image to sequentially display each image in the identified set of images, one after another over time. In this situation, play back of the animated image may include initiating display of a first image of the set for a first duration of time, and initiating display of a second image for a second duration of time.

In yet another related embodiment, identifying the set of images may include analyzing time stamps associated with the group of images to identify which of multiple images in the group were taken closest in time, and selecting the multiple images from the group for inclusion in the animated image to represent the group of images.

In still another related embodiment, identification of representative images may include dividing the group of images into subgroups. Each subgroup may include images with corresponding timestamps when the images were produced. The preview generator application according to embodiments herein selects one or more images from each subgroup to serve as a representative image of the subgroup depending on time differences between the timestamps.

In a further related embodiment, dividing the images into subgroups may include determining a respective timestamp for each image in the group. Images in a subgroup may include a sequence that ranges from an earliest time stamp value associated with a first image to a latest time stamp value associated with a last image in the timestamp sequence. The preview generator application compares the timestamp of each image, beginning with the first image, with the timestamp of a next image according to the timestamp sequence to produce a result, such as whether the difference in time stamps from one image to the next is within a threshold value. If the result does not exceed a threshold value (e.g., a fixed value), then the preview generator application includes such images in an existing subgroup. If the result does exceed a threshold value (e.g., a fixed value), the preview generator application closes the current existing subgroup and starts a new existing subgroup with the next image.

In another further related embodiment, the method may include optimizing the subgroups by varying the threshold value to produce groupings of successive images. For example, a threshold value may be varied from one subgroup of images to the next such that two consecutive subgroups according to the timestamp sequence are expanded until overlap of the subgroups is about to occur.

In another related embodiment, the preview generator application may receive a selection of multiple groups of images; identify a set of images from each group as being representative of that group; and create an animated image to serve as a preview of the number of groups. The animated image or preview of animated images may include a portion of the identified set of representative images from the groups.

In still another related embodiment, the method may include presenting the identified set of images to a user for selection of those images to be included in an animated image. In response to a user's selection, the preview generator application may create an animated image to serve as a preview for the group. For example, the animated image may include those identified images selected by the user as representative images of the group. Accordingly, a user may manually select which of multiple images to include in a preview.

In yet still another related embodiment, the preview generator application may create an animated image to serve as a preview of the group, wherein each frame of the animated image comprises a number of the identified number of representative digital images from the group.

In another embodiment, there is provided a computer system. The computer system includes a memory; a processor; a display; and an interconnection mechanism coupling the memory, the processor and the display allowing communication there between. The memory is encoded with an preview generator application, that when executed in the processor, provides an preview generator process that that generates an animated preview of a number of images, by causing the computer system to perform the operations of: receiving a selection of a group of images; identifying a set of images from the group as being representative of the group; and creating an animated image to serve as a preview of the group, the animated image configured to display the identified set of images for indicating attributes of content stored in a storage resource.

In another embodiment, there is provided a computer program product, stored on computer readable medium, to generate an animated preview of a number of images. The computer program product includes computer program code for receiving a selection of a group of images; computer program code for identifying a set of images from the group as being representative of the group; and computer program code for creating an animated image to serve as a preview of the group, the animated image configured to display the identified set of images for indicating attributes of content stored in a storage resource.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Generally, embodiments disclosed herein include methods, apparatus, systems, etc. for generating animated previews of a number of digital images stored in one or more locations. One or more digital images is selected by a user, and provided as input to a preview generator application. The preview generator application identifies one or more images from the inputted images as being most representative of the group of images as a whole. One reason for selecting the one or more representative images is to display the one or more representative images in a preview window so that a user is able to quickly identify contents of, for example, a corresponding folder of images. In other words, when a person generally familiar with the images views the one or more displayed representative image (e.g., pictures such as a birthday party or vacation), the person is able to identify what the images are contained within a corresponding folder. Thus, the application then takes those representative images and creates an animated preview, which is displayed to users who are browsing the image files.

Figure 1:
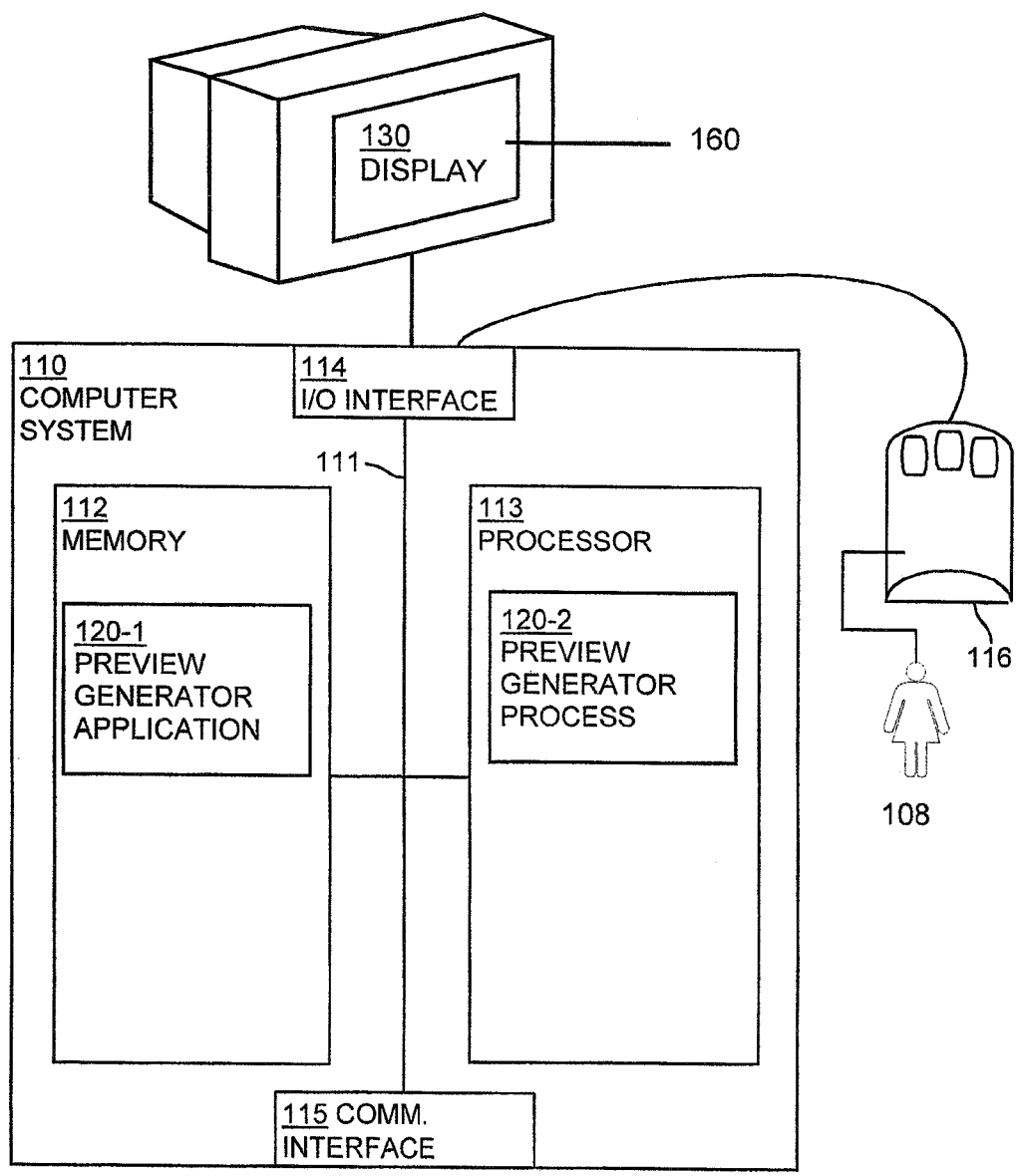
FIG. 1 is an example block diagram of a computer system according to one embodiment disclosed herein.

FIG. 1 is a block diagram illustrating an example architecture of a computer system 110 that executes, runs, interprets, operates or otherwise performs a preview generator application 140-1 and a preview generator process 140-2 suitable for use in explaining example configurations disclosed herein. The computer system 110 may be any type of computerized device such as a personal computer, workstation, portable computing device, console, laptop, network terminal or the like.

As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a person who takes or manages digital photographs to provide input commands and generally control a graphical user interface 160 on display 130. The communications interface 115 enables the computer system 110 to communicate with other devices (e.g., other computers) on a network (not shown in FIG. 1).

The memory system 112 is any type of computer readable medium and in this example is encoded with a preview generator application 140-1. The preview generator application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the preview generator application 140-1.

Execution of the preview generator application 140-1 in this manner produces processing functionality in preview generator process 140-2. In other words, the preview generator process 140-2 represents one or more portions or runtime instances of the preview generator application 140-1 performing or executing within or upon the processor 113 in the computer system 110 at runtime.

Generally, while operating the computer system 110, the user 108 manipulates at least one input device 116, such as a computer mouse, keyboard, etc. Through the manipulation of the at least one input device 116, the user 108 may provide input (e.g., commands) to a graphical user interface 160. For example, the user 108 might engage the preview generator application 140-1 by selecting a number of digital images that the user wishes to create an animated preview according to embodiments herein. For example, the user 108 may select one or more images with via use of input device 116. The preview generator application 140-1, executing as the preview generator process 140-2, thus is able to receive signals or commands indicating the selection of a group of digital images. Further operations associated with preview generator are discussed below in the following figures.

It is noted that example configurations disclosed herein include the preview generator application 140-1 itself including the preview generator process 140-2 (i.e., in the form of un-executed or non-performing logic instructions and/or data). The preview generator application 140-1 may be stored on a computer readable medium (such as a floppy disk), hard disk, electronic, magnetic, optical or other computer readable medium. The preview generator application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the preview generator application 140-1 in the processor 113 as the preview generator process 140-2. Those skilled in the art will understand that the computer system 110 may include other processes and/or software and hardware components, such as an operating system, etc.

Note that the display 130 need not be coupled directly to computer system 110. For example, the preview generator application 140-1 may be executed on a remotely accessible computerized device over a network via the communication interface 115. In this instance, the graphical user interface 160 may be displayed locally to a user of the remote computer and execution of the processing herein may be client-server based.

Embodiments described below further disclose generating an animated preview of a number of digital images. FIGS. 2 and 6-9 are flowcharts of various embodiments of the preview generator process 140-2. The rectangular elements are herein denoted "processing blocks" and represent computer software instructions or groups of instructions. Thus, the processing blocks may represent steps performed by functionally equivalent circuits such as a digital signal processor circuit or an application specific integrated circuit (ASIC).

In the example shown, the flowcharts do not necessarily depict the syntax of any particular programming language. Rather, the flowcharts illustrate the functional information one of ordinary skill in the art requires to fabricate circuits or to generate computer software to perform the processing required in accordance with the present invention.

It should be noted that many routine program elements, such as initialization of loops and variables and the use of temporary variables may be used to carry out such processes as depicted in the flowcharts. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

As briefly stated above, a user 108 (shown in FIG. 1) may select any number of digital images as a group of digital images for which the preview generator application 140-1 will generate an animated preview. The user 108 may operate an input device, such as the input device 116 shown in FIG. 1, to choose a number of icons, thumbnails, or other identifying elements (associated with one or more images) on a graphical user interface, such as the graphical user interface 160 shown in FIG. 1.

In addition to movement of a cursor and selection of symbols representing images, the user 108 may input text-string commands through use of the input device 116 to identify the digital image files that the user 108 wishes to be a part of the group. Such commands may be provided by the user 108, via the input device 116, to a command prompt, command entry line, or a graphical representation thereof, which may include graphical elements such as menus, command boxes, buttons, and so forth.

The digital images as selected by the user 108 may be stored in a repository such as memory 112 (shown in FIG. 1) that also stores the preview generator application 140-1. Alternatively, the digital images may be stored in a storage device that is exterior to the computer system 110, and located either locally (i.e., a database connected to the computer system 110 that is in the same physical location as the computer system 110) or at another location (i.e., a storage device connected to the computer system 110 via a network and the network interface 115). The location of the digital image files is not important for purposes of execution of the animating previewing application 140-1, only that the computer system 110, and thus the user 108, has access to those files.

Figure 2:
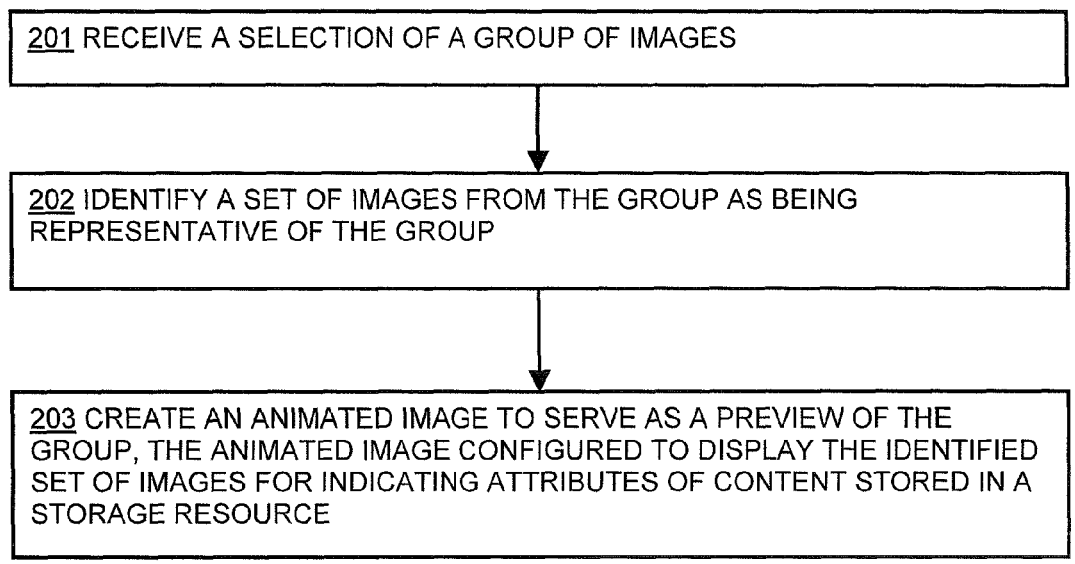
FIG. 2 illustrates an example flowchart of a procedure performed by the system of FIG. 1 when the preview generator application is executed to generate an animated preview of a group of digital images according to embodiments herein.

FIG. 2 is an example diagram illustrating generation of one or more animated previews of images according to embodiments herein. For example, initially, the user 108 selects a group of images. In step 201, the preview generator process 140-2 receives a selection of the group of images. The selection may include any number of images. The images may be stored in one or more different folders or other locations. Alternatively, the images may all be selected from the same folder, subfolder, or storage location.

Based on the selection of images, the preview generator process 140-2 identifies a number (e.g., a set or subset) of digital images from the group as being representative of the group in step 202. As described above, an image may be considered to be representative of the group if, upon being viewed by a person familiar with the images, the person associates that image with a particular event.

Finally, in step 203, the preview generator process 140-2 creates an animated image to serve as a preview of the group. In one embodiment, the animated image (or preview) includes all or a portion of the identified number of representative digital images from the group. In other words, the animated image may use some or all of the identified representative images to produce the preview for display to a user.

As stated above, the animated image representing a preview of the set of images may be created as an animated GIF file, an animated JPEG file, or any other type of animated image file.

Figure 3:
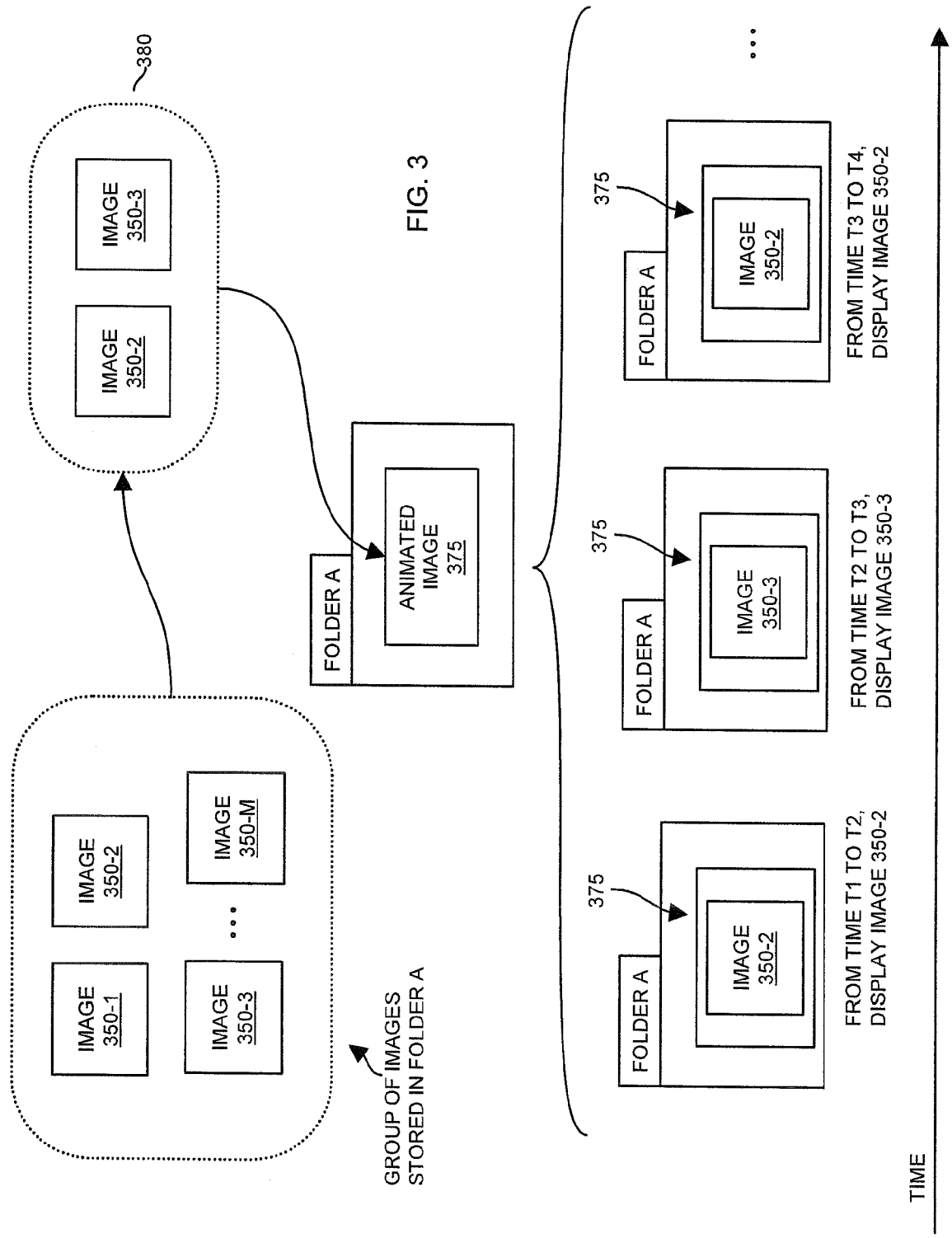
FIG. 3 is an example diagram illustrating creation and use of an animated image according to embodiments herein.

FIG. 3 is an example diagram illustrating creation and display of an animated image according to embodiments herein. As shown, storage resource such as Folder A of a storage system (e.g., a file system for storing content such as images) includes images 350 (e.g., image 350-1, image 350-2, image 350-3, . . . , image 350-M). As previously discussed, the preview generator application 140-1 may automatically select which of the images 350 will be used to created animated image 375 based on, for example, different parameters (e.g., time stamps associated with the images 350 indicating when the images (e.g., photographs, snapshots, videos, etc.) were produced or taken. In another embodiment, a user may manually specify which of the images 350 stored in folder A are representative of the content in folder A and will be used to produce the animated image 375.

In the context of the present example, the selected set of images 380 (e.g., representative images) includes image 350-1 and image 350-2. Rather than display a thumbnail of each image in folder A so that a viewer may identify contents of folder A, animated image 375 enables a user to view representative images (e.g., selected set of images 380) in folder A over time. For example, as shown at the bottom of FIG. 3, execution of animated image 375 with respect to folder A enables viewing of image 350-2 between time T1 and T2, image 350-3 between time T2 and T3, image 350-2 between time T3 and T4, and so on. Note that this enables the user to view a symbolic representation of folder A (e.g., stored information) without having to view its entire contents. Instead, the user is able to watch the animated image 375 over an amount of time to view a number of pictures stored in the folder. Accordingly, one embodiment herein includes associating the animated image 375 with the storage resource (e.g., folder A) of a storage system that stores the group of images and enabling play back of the animated image 375 to provide an indication of the content stored in the storage resource.

A pattern of displaying the selected set of images 380 may include repeating a sequential pattern of displaying the images over time. For example, when executed, animated image 375 may repeatedly display image 350-2 and image 350-3, one after the other, so that a user may identify contents of folder A. Thus, one embodiment herein includes configuring the animated image 375 to repeatedly sequence through temporary display of each image in the set of images 380 in a preview window associated with the storage resource (e.g., folder A) to provide a visual indication of the available content stored in folder A.

The folder may include related images 350 such as pictures images that were taken close in time such as the same day, pictures that are related to a common event such as a new year's eve party, pictures that are of a same basic theme such as images of boats, etc. Accordingly, one embodiment herein includes configuring the animated image 375 to sequentially display each image in the identified set of images 380, one after another over time, in a frame of a preview window associated with the storage resource (e.g., folder A) when the storage resource is displayed on a display screen. Displaying a portion of the images over time for a given folder enables a respective user to view just a couple (or more) representative photos to identify contents of a folder. This may be more useful than simultaneously displaying a small thumbnail of every image 350 stored in the respective folder.

Of course, embodiments herein include generating animated images associated with each of many folders of images such that a viewer may initiate display of multiple folders on a display screen at the same time. In the context of such an embodiment, a display region associated with each folder would play back a respective animated image so that the user may easily view the respective folders and identify which folders to select for viewing. For example, when displayed, a user may select a respective folder to open the folder and display its entire contents as selected thumbnail images that may be enlarged for further viewing.

Accordingly, the preview generator supports operations of receiving a selection of a group of images; identifying a set of images from the group as being representative of the group; and creating an animated image 375 to serve as a preview of the group, the animated image configured to display the identified set of images 380 for indicating attributes of content stored in a storage resource (e.g., folder A).

Figure 4:
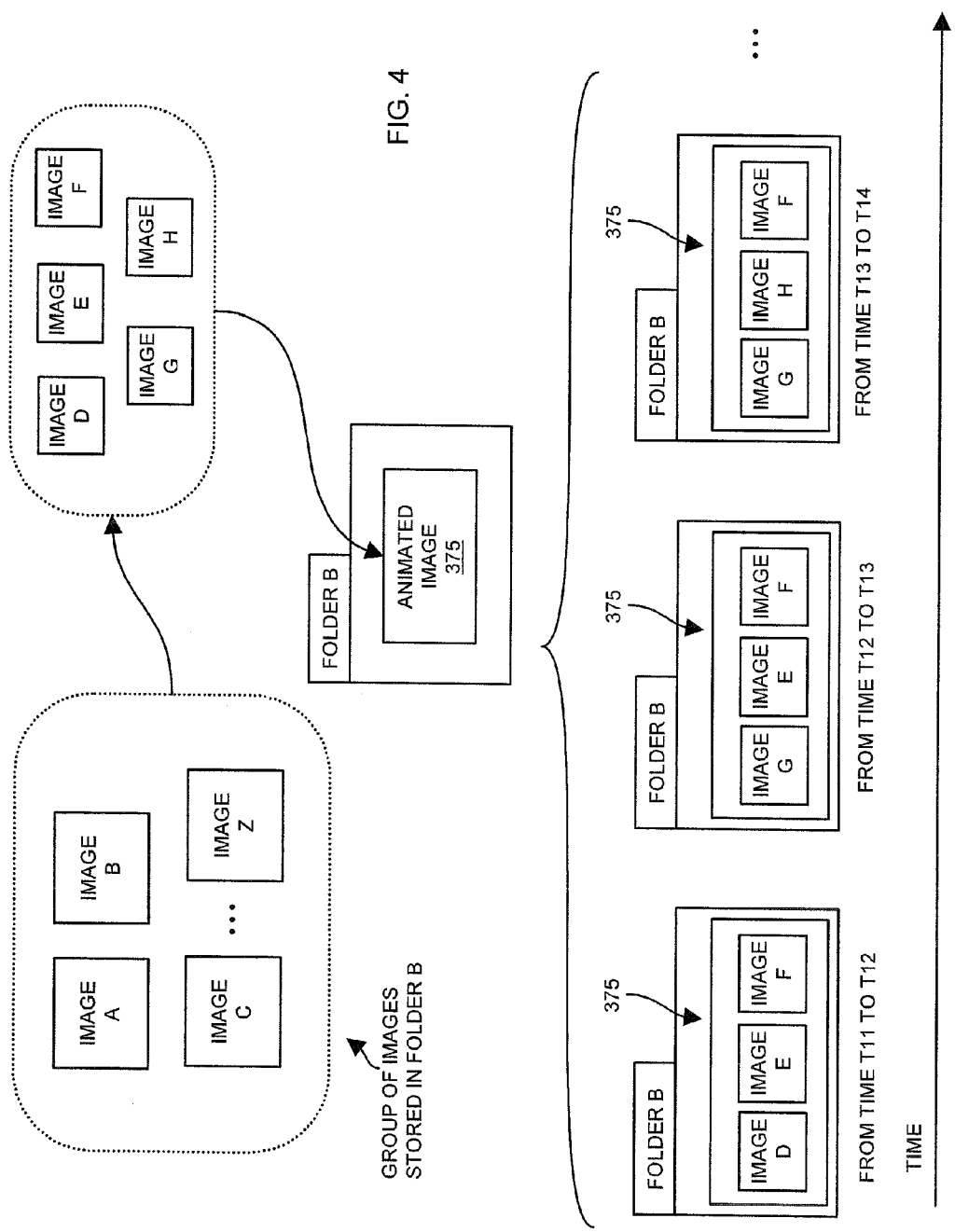
FIG. 4 is an example diagram illustrating creation and use of an animated image according to embodiments herein.

FIG. 4 is an example diagram illustrating creation and use of animated image 375 according to embodiments herein. For example, folder B includes image A, image B, image C, ..., image Z. Assume that images D, E, F, G, and H have been selected as representative images associated with folder B.

During play back of animated image 375 associated with folder B, a display region associated with folder B displays images D, E, and F between time T11 and T12. Between times T12 and T13, the animated image 375 initiates display of images G, E, and F in folder B. Between times T13 and T14, the animated image 375 initiates display of images G, H, and F in folder B.

Figure 5:
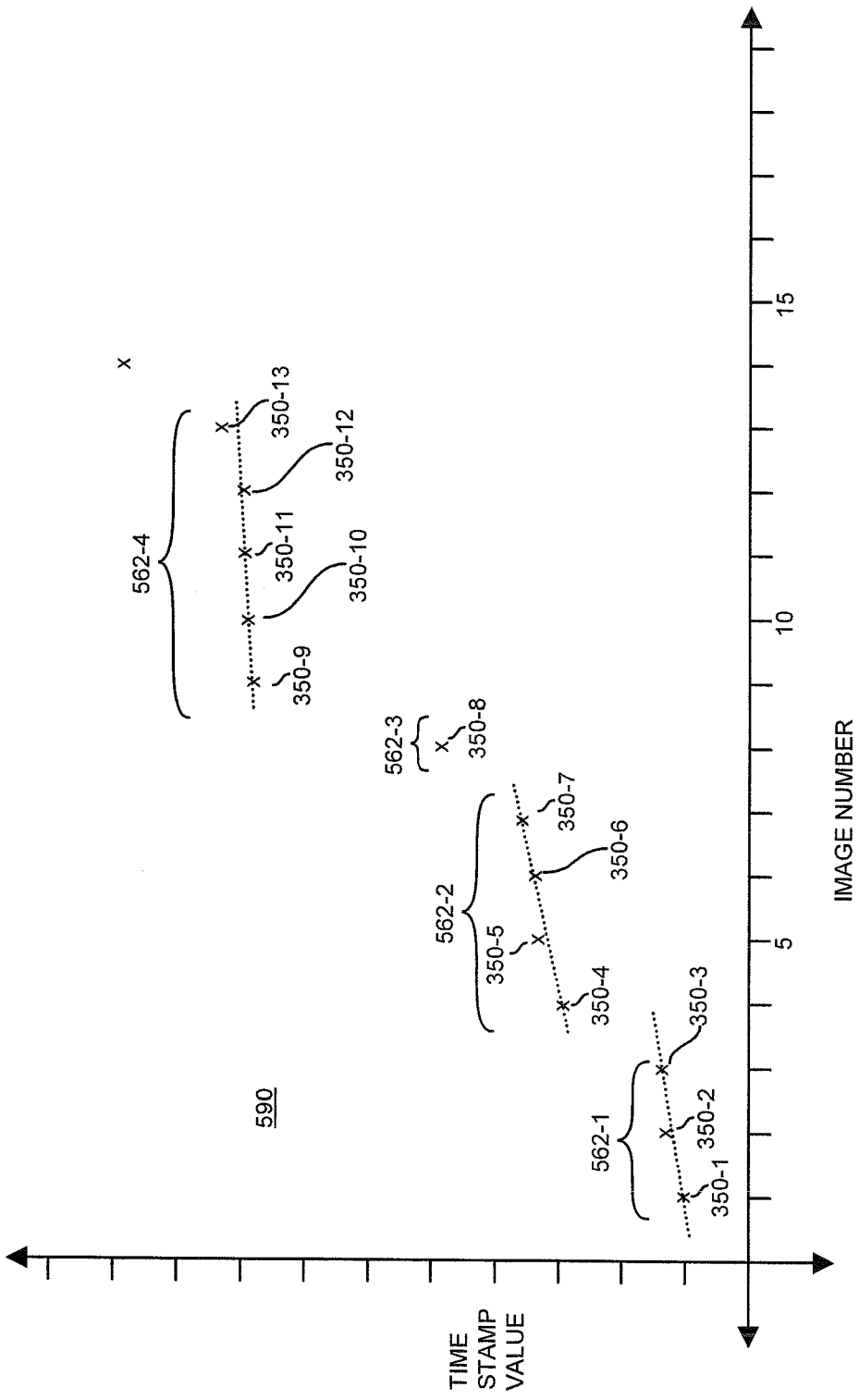
FIG. 5 is an example graph illustrating groupings of images based on time according to embodiments herein.

FIG. 5 is an example graph 590 illustrating an analysis of images to produce sub-groupings according to embodiments herein. The horizontal axis (e.g., x-axis) represents the image number in a sequence of multiple images 350 taken over time. The vertical axis (e.g., y-axis) represents a time when the image was produce or taken.

According to embodiments herein, as mentioned above, the preview generator may analyze timestamp information associated with successive images to identify, which images 350 were taken at around the same time and are likely related to each other. For example, one way to determine which images are probably related is to analyze a slope between images to identify which images 350 lie on or near a hypothetical line. Those that lie on or near a line between sample images indicate related photos. Substantial differences in time from one image to the next such as between image 350-3 and image 350-4, image 350-7 and image 350-8, ... indicate a new subgroup 562. In the context of the present example, subgroup 562-1 includes images 350-1, 350-2, and 350-3. Subgroup 562-2 includes images 350-4, 350-5, 350-6, and 350-7. Subgroup 562-3 includes image 350-8. Subgroup 562-4 includes images 350-9, 350-10, 350-11, 350-12, and 350-13.

For each subgroup 562, the preview generator may analyze the time stamps associated with a group of images to identify which of multiple images in the group were taken closest in time to identify the images in the subgroup that are most likely representative of the subgroup of images. In one embodiment, the preview generator selects multiple images closest in time for inclusion in the animated image 375 representing the subgroup.

Figure 6:
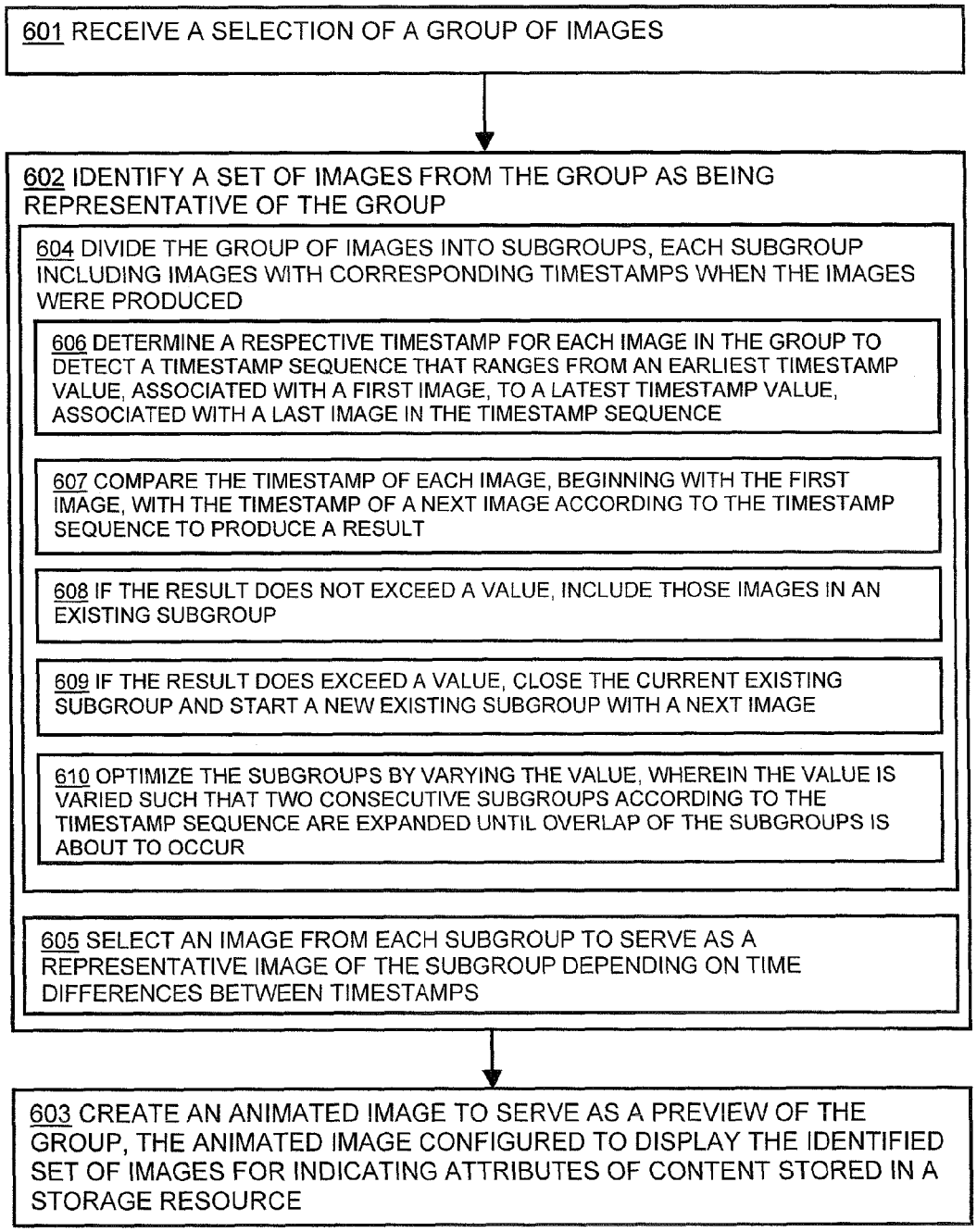
FIG. 6 illustrates an example flowchart of a procedure performed by the system of FIG. 1 when the preview generator application, during execution, generates an animated preview of digital images by dividing the images into subgroups according to embodiments herein.

FIG. 6 illustrates further details regarding how the preview generator process 140-2 identifies images as being representative of the group of selected digital images according to embodiments herein.

For example, in step 601, the preview generator receives a selection of a group of images. After receiving a selection of a group of images in step 601, the preview generator process 140-2 identifies a set of images from the group as being representative of the group in step 602.

In one embodiment, the preview generator process 140-2 identifies representative images by dividing the group of images into subgroups as specified by step 604. Each subgroup created by the preview generator process 140-2 includes images with a timestamp. Each timestamp of an image corresponds to when the image was produced.

As an example, suppose that the preview generator process 140-2 receives a selection of twelve digital images, and the timestamps for those digital images are as follows: 00:00:10, 00:00:12, 00:00:13, 00:01:16, 00:01:18, 00:01:20, 00:01:22, 00:05:10, 00:05:12, 00:05:14, 00:05:16, and 00:05:18. In other words, the first three digital images were created at ten seconds after midnight, twelve seconds after midnight, and thirteen seconds after midnight, respectively. The next four images were created at one minute sixteen seconds after midnight, one minute eighteen seconds after midnight, one minute twenty second after midnight, and one minute twenty-two seconds after midnight, respectively. The final five digital images in the group were created at five minutes ten seconds after midnight, five minutes twelve seconds after midnight, five minutes fourteen seconds after midnight, five minutes sixteen seconds after midnight, and five minutes eighteen seconds after midnight, respectively.

The variance in the timestamps (e.g., difference in time stamp values from each of the successive images) may reflect, for example, different events that the person taking the digital images sought to capture. For example, the first three images might be an image of a couple kissing in the seconds after midnight on New Year's Eve. The next four images might be of a group of people singing "Auld Lang Syne" in the first minute after midnight on New Year's Eve. The last five images might be of people going around a room filled with revelers and wishing each other "Happy New Year" in the first few minutes after midnight on New Year's Eve. Such groupings by time, for example, are quire common in photography, as photographers tend to take pictures in bunches around certain events.

The preview generator process 140-2 may then divide the images into subgroups by first determining the respective timestamp for each image in the group to detect a timestamp sequence, step 606. In the New Year's Eve example, the timestamps are as above. The timestamps indicate a timestamp sequence that ranges from an earliest timestamp value, associated with a first image, to a latest timestamp value, associated with a last image in the timestamp sequence. In other words, the preview generator process 140-2 arranges the images according to timestamps, from the earliest timestamp in the group to the most recent timestamp, which results in the timestamp sequence. In the New Year's Eve example, the timestamp sequence ranges from 00:00:10 to 00:05:18.

The preview generator process 140-2 then compares the timestamp of each image, beginning with the first image, with the timestamp of a next image according to the timestamp sequence to produce a result, step 607. If the result does not exceed a value, the preview generator process 140-2 includes those images in an existing subgroup, step 608. However, if the result does exceed a value, the preview generator process 140-2 closes the current existing subgroup and starts a new existing subgroup with a next image, step 609. Using the New Year's Eve example from above, the preview generator process 140-2 will first compare the timestamp of the first image in the group, 00:00:10, with the timestamp of the next image in the timestamp sequence, namely 00:00:12. The result is the difference between the two timestamps, which is 00:00:02, or two seconds. If the value being used is, say, 00:00:10 (that is, ten seconds), the preview generator process 140-2 places the first image and the second image in the current existing subgroup because two is less than the threshold value of ten. Note that the value represents an amount of time between timestamps of digital images.

The preview generator process 140-2 will then compare the timestamp of the second image, 00:00:12, with the timestamp of the next image in the timestamp sequence, 00:00:13. As the difference between the timestamps is 00:00:01 (or one second), which is less then the threshold value of ten seconds, the preview generator process 140-2 also places the third image in the current existing subgroup. Note that the preview generator process 140-2 does not need to place the second image (with timestamp of 00:00:12) into the subgroup, as it is already there. The preview generator process 140-2 will then compare the timestamps of the third image (00:00:13) and the fourth image (00:01:16), and finds a difference of 00:01:13, or one minute thirteen seconds. Because this difference exceeds the threshold value (e.g., a fixed or predetermined value) of ten seconds, the preview generator process 140-2 closes the current existing subgroup and places the fourth image (with timestamp of 00:01:16) in a new existing subgroup. The preview generator process 140-2 repeats this process for image in the group. The result is three subgroups, one for the first three images, one for the next four images, and one for the last five images.

However, simply using a threshold value for purposes of dividing images into subgroups may not always suffice. For example, say a photographer is taking pictures of a group of people who are posing, such as a wedding party. The photographer may wait for many seconds between shots, as people adjust their posture, their hair and/or makeup, clothing, facial expressions, etc. In that kind of situation, using a low fixed value of ten, such as in the New Year's Eve example above, would create a number of subgroups of pictures when in actuality, one or two subgroups might be more appropriate. This could be alleviated by allowing a user to set the value used by the preview generator process 140-2, as the user may have insight about the images and the conditions under which they were taken that the preview generator process 140-2 is otherwise unable to tell from merely examining the timestamps.

Instead of using a static threshold value, or allowing user input, the preview generator process 140-2 may be programmed to itself find an optimal value based on modifying the threshold value. For example, the preview generator process 140-2 may then optimize the subgroups by varying the threshold value in step 310. However, the preview generator process 140-2 may start a grouping process by using a predetermined threshold value, as described above.

The preview generator process 140-2 then varies this initial value such that two consecutive subgroups according to the timestamp sequence are expanded until overlap of the subgroups is about to occur. For example, the preview generator may identify a first subgroup and a second subgroup side by side in terms of timestamps. The preview generator may increase the threshold value used to capture more images for inclusion in each subgroup until one or more of the images is about to be included in both subgroups. The preview generator process 140-2 may then leave the fixed value alone, or continue to refine it for other subgroups of pictures. Other optimization techniques may of course be used.

Further, other ways of identifying representative images according to timestamp data are also possible. For example, the preview generator process 140-2 may determine the differences between consecutive timestamps, as described above, and then graph those differences versus an identifier for each image (such as the number of the image according to the timestamp sequence). As mentioned above, the preview generator process 140-2 may then perform a graphical analysis to determine changes in slope in the graph, with more significant changes in slope indicating a greater distance in time between images, and thus potentially indicating different subgroups of images. Alternatively, the preview generator process 140-2 may apply a linear regression technique, or a variation thereof, and use the resultant best-fit line or lines to find different subgroups. Further, such data may be presented in graphical or other form to a user, who may then be able to provide input indicating where subgroups should begin and end.

Finally, after the preview generator process 140-2 has appropriately divided the images into subgroups, the preview generator process 140-2 may select one or more images from each subgroup to serve as a representative image of the subgroup depending on time differences between timestamps, step 605. The preview generator process 140-2 then uses these representative images of each subgroup to create an animated image to serve as a preview of the group, step 603. The process of choosing the one or more representative images may include selecting multiple images having closest corresponding time stamps, picking the first one or more images in a subgroup to be representative images for the subgroup, randomly picking one or more images in the subgroup as representative images, etc.

Figure 7:
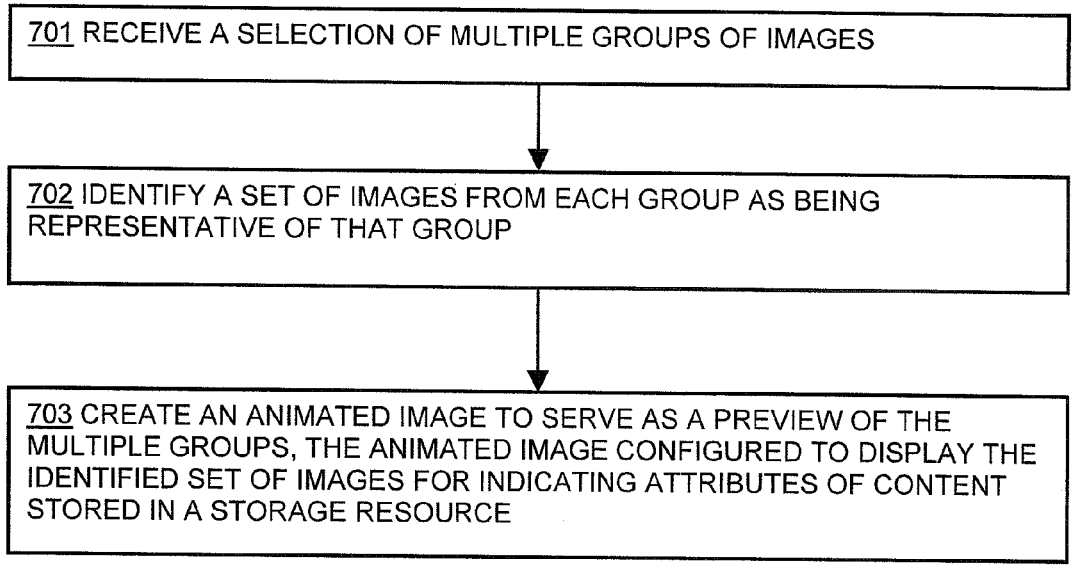
FIG. 7 illustrates an example flowchart of a procedure performed by the system of FIG. 1 when the animated preview application is executed to generate an animated preview of a number of groups of digital images according to embodiments herein.

In FIG. 7, the preview generator process 140-2 acts on multiple groups of images. The preview generator process 140-2 first receives a selection of multiple groups of images, step 701. The selection may be, for example but not limited to, of a number of folders where each folder contains one or more image files. As with the selection of a single group of images, the image files may be located in one or more storage locations that the preview generator process 140-2 has access to. The preview generator process 140-2 then identifies a set of images from each group as being representative of that group, step 702. The preview generator process 140-2 may identify representative images according to any of the methods described above. Finally, the preview generator process 140-2 creates an animated image to serve as a preview of the multiple groups, step 703. The animated image created by the preview generator process 140-2 includes at least a portion of the identified number of representative images from the groups.

Figure 8:
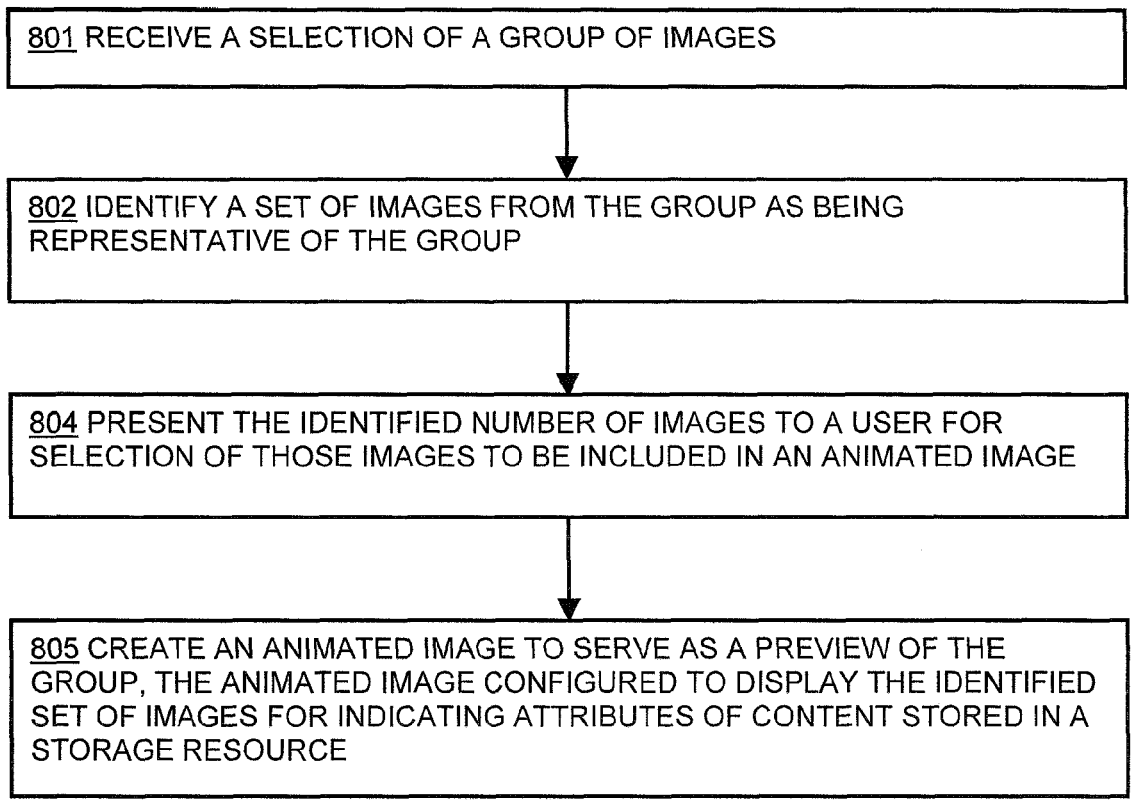
FIG. 8 illustrates an example flowchart of a procedure performed by the system of FIG. 1 when the preview generator application, during execution, allows a user to select those images that the application will use to generate the animated preview according to embodiments herein.

FIG. 8 illustrates a method by which the preview generator process 140-2 creates an animated preview according to user input. The preview generator process 140-2 first receives a selection of a group of images, step 801. The preview generator process 140-2 then identifies a set of images from the group as being representative of the group, step 802. Any method of identifying an image as being representative of the group may be used. The preview generator process 140-2 then presents the identified set of images to a user for selection of those images to be included in an animated image, step 804. The user may select those images by using an input device, such as the input device 116 shown in FIG. 1, or by any other means of entering commands or otherwise providing signals to the preview generator process 140-2 that indicate those images the user wishes to be in the animated preview image. Further, the images presented by the preview generator process 140-2 may be thumbnails or other visual representations of the images shown on a graphical user interface, or may be represented in another way, such as but not limited to a file name or other identifying information. Finally, the preview generator process 140-2 creates an animated image to serve as a preview of the group, the animated image configured to display the identified set of images for indicating attributes of content stored in a storage resource, step 805.

Figure 9:
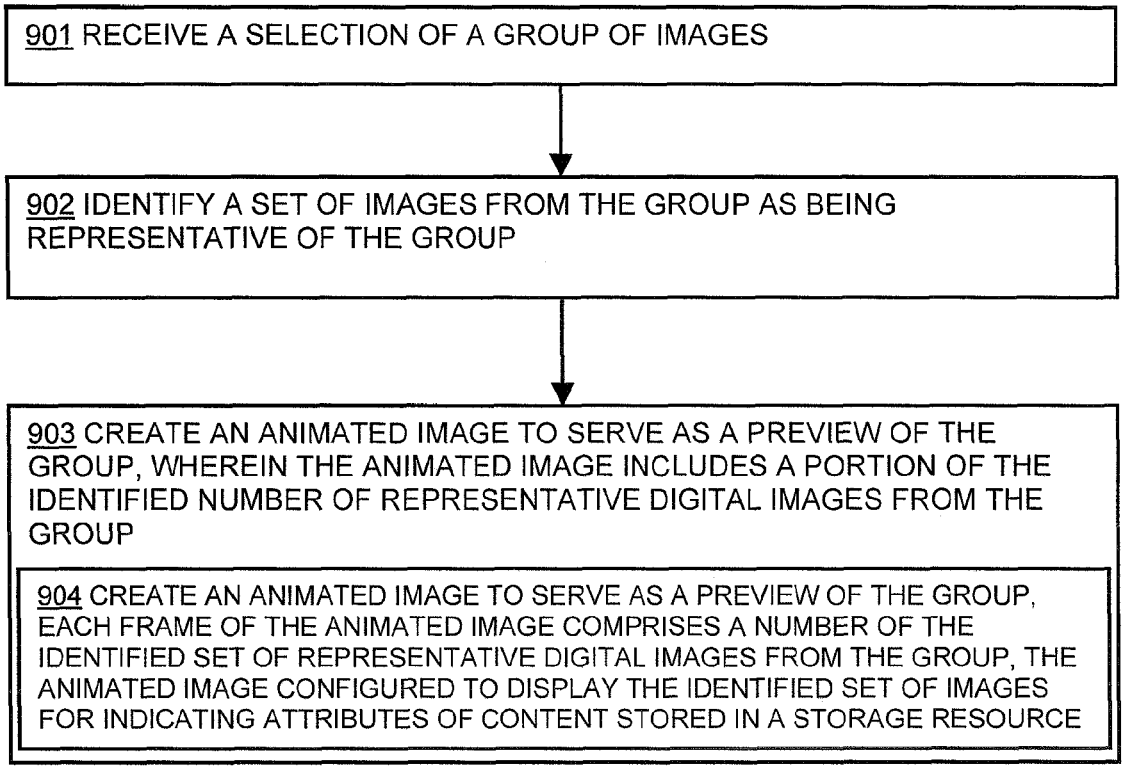
FIG. 9 illustrates an example flowchart of a procedure performed by the system of FIG. 1 when the preview generator application is executed to generate a rotating animated preview of a group of digital images according to embodiments herein.

In FIG. 9, the preview generator process 140-2 creates an animated preview of a different type from those described above. The preview generator process 140-2 first receives a selection of a group of images, step 901. The preview generator process 140-2 then identifies a set of images from the group as being representative of the group, step 902. Any method of identifying an image as being representative of the group, such as those described above, may be used. Here, however, instead of creating a typical animated image file, the preview generator process 140-2 creates an animated image to serve as a preview of the group, wherein each frame of the animated image comprises a number of the identified set of representative digital images from the group, the animated image configured to display the identified set of images for indicating attributes of content stored in a storage resource, step 904.

An example algorithm according to embodiments disclosed above is as follows. The purpose of the algorithm is to divide a set of digital photographs into subsets which contains related photos. Say a folder X has N digital photographs with EXIF format support. The EXIF format will have the actual timestamp. Say a digital photograph $a_i$ has $d_i$ as the timestamp. Say that $S_I=\{d_i | \text{time stamp of } a_i; i=1 \text{ to } N\}$. So the input to algorithm is $S_I$ and output will be $O_I=\{D_i | D_i$ is a set of Index of $a_i$ which are "time related"$\}$. First, if $|S_I|=$Empty then return. Next, using $S_I$, compute a sequence of time stamp difference, i.e., $\delta_i=d_{i+1}-d_i$ for i=1 to N, where N is the number of photographs. A sequence $S_\delta$ is created which contains $\delta_i$ for all i. Then, $S_\delta$ is scanned top to bottom and the following checks are made: (a) i=1 and j=1; (b) if $\delta_i <= \lambda$ put i inside Dj, else if (Dj!=Empty) j=j+1, Endif; (c) i=i+1; (d) goto b. After the previous step, the result will be a collection of Di, i.e., $O_I$. From $O_I$ we will pick up one index out of each Di and use it for thumbnail.

In the above example algorithm, $\lambda$ is set as a particular value, which will not result in the correct result every time. The value of $\lambda$ may be updated at run time. Selecting $\lambda$ appropriately is another example algorithm, as follows. Distance(ai,aj)=|i−j| where i and j are the indexes of digital photographs ai and aj. Start with $\lambda=$Min($S_\delta$), that is, start with the minimum value of $S_\delta$. (1) Next, set $O_{Iold}=$NULL. Then, remove the above example algorithm to get $O_I$. Next, if $|O_I|>=3 || |O_I|==0 || \lambda>=$Max($S_\delta$) (cardinality of $O_I$), and return. Else, if any new entry is made in any of the Di sets in $O_I$ compared to the Di set of $O_{Iold}$ (both Di sets are similar) then check the distance between the new entry and the first and last element of Di of $O_{Iold}$. If any of the distances are==1 then $O_{Iold}=O_I$; $O_I$ is guaranteed to have at least one Di set. Increment $\lambda$ (i.e., $\lambda=\lambda+1$ and goto (1), else stop and return. The check of the distance between the new entry and the first and last element of Di of $O_{Iold}$ is necessary to see if an element is being added that is not in sequence with the already existing Di (which is in sequence). At the end of the algorithm, there may be only one subset, or there may be two or three or more, which may affect the animated preview.

Note that the above algorithms may be used to create various implementations of code and/or pseudo code according to embodiments of the invention as described herein, and that no particular implementation is implied by the above algorithm descriptions.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method comprising:
   identifying, via execution of at least one processor device of a computer, a group of images;
   identifying a set of images from the group as being representative of the group by dividing the group of images into subgroups, each subgroup comprising images with corresponding timestamps when the images were produced, wherein dividing comprises:
   determining a timestamp sequence that ranges from an earliest timestamp value, associated with a first image in the subgroup, to a latest timestamp value, associated with a last image in the subgroup;
   comparing the timestamp of each image, beginning with the first image, with the timestamp of a next image according to the timestamp sequence to produce a result;
   if the result does not exceed a value, including the next images in an existing subgroup; and
   if the result does exceed a value, closing the current existing subgroup and starting a new subgroup with the next image;
   selecting an image from each subgroup to serve as a representative image of the subgroup; and
   creating an animated image to serve as a preview of the group, the animated image configured to display the identified set of images for indicating attributes of content stored in a storage resource.

2. The method as in claim 1 further comprising:
   associating the animated image with the storage resource of a storage system that stores the group of images; and
   enabling play back of the animated image to provide an indication of the content stored in the storage resource.

3. The method as in claim 2 further comprising:
   configuring the animated image to sequentially display each image in the identified set of images, one after another over time, in a frame of a preview window associated with the storage resource when the storage resource is displayed on a display screen.

4. The method as in claim 2 further comprising configuring the animated image to repeatedly sequence through a temporary display of each image in the set of images in a preview window associated with the storage resource to provide a visual indication of the available content stored in the storage resource.

5. The method as in claim 1 further comprising:
   configuring the animated image to sequentially display each image in the identified set of images, one after another over time, such that play back of the animated image comprises:
   initiating display of a first image of the set for a first duration of time; and
   initiating display of a second image for a second duration of time.

6. The method of claim 1 comprising presenting the identified set of images for selection of images to be included in the animated image.

7. The method of claim 1, wherein a frame of the animated image comprises a plurality of the images.

8. A computer system comprising:
   a memory;
   a processor;
   a display;
   an interconnection mechanism coupling the memory, the processor and the display allowing communication there between;
   wherein the memory is encoded with an preview generator application, that when executed in the processor, provides an preview generator process that generates an animated preview of a number of images, by causing the computer system to perform the operations comprising:
   identifying a group of images;
   identifying a set of images from the group as being representative of the group by dividing the group of images into subgroups, each subgroup comprising images with corresponding timestamps when the images were produced, wherein dividing comprises:
   determining a timestamp sequence that ranges from an earliest timestamp value, associated with a first image in the subgroup, to a latest timestamp value, associated with a last image in the subgroup;
   comparing the timestamp of each image, beginning with the first image, with the timestamp of a next image according to the timestamp sequence to produce a result;

if the result does not exceed a value, including the next images in an existing subgroup; and if the result does exceed a value, closing the current existing subgroup and starting a new subgroup with the next image;

selecting an image from each subgroup to serve as a representative image of the subgroup; and creating an animated image to serve as a preview of the group, the animated image configured to display the identified set of images for indicating attributes of content stored in a storage resource.

9. The computer system of claim 8 further supporting operations of:

associating the animated image with the storage resource of a storage system that stores the group of images; and enabling play back of the animated image to provide an indication of the content stored in the storage resource.

10. The computer system of claim 9 further supporting operations of:

configuring the animated image to sequentially display each image in the identified set of images, one after another over time, in a frame of a preview window associated with the storage resource when the storage resource is displayed on the display.

11. The computer system of claim 9 further supporting an operation of configuring the animated image to repeatedly sequence through a temporary display of each image in the set of images in a preview window associated with the storage resource to provide a visual indication of the available content stored in the storage resource.

12. The computer system of claim 8 further supporting operations of: configuring the animated image to sequentially display each image in the identified set of images, one after another over time, such that play back of the animated image comprises:

initiating display of a first image of the set for a first duration of time; and initiating display of a second image for a second duration of time.

13. The computer system of claim 8 further supporting an operation of presenting the identified set of images for selection of images to be included in the animated image.

14. A non-transitory computer readable medium comprising instructions stored thereon, the computer readable medium comprising:

program code for identifying a group of images;

program code for identifying a set of images from the group as being representative of the group by dividing the group of images into subgroups, each subgroup comprising images with corresponding timestamps when the images were produced, wherein dividing comprises:

determining a timestamp sequence that ranges from an earliest timestamp value, associated with a first image in the subgroup, to a latest timestamp value, associated with a last image in the subgroup;

comparing the timestamp of each image, beginning with the first image, with the timestamp of a next image according to the timestamp sequence to produce a result;

if the result does not exceed a value, including the next images in an existing subgroup; and if the result does exceed a value, closing the current existing subgroup and starting a new subgroup with the next image;

program code for selecting an image from each subgroup to serve as a representative image of the subgroup; and program code for creating an animated image to serve as a preview of the group, the animated image configured to display the identified set of images for indicating attributes of content stored in a storage resource.

15. The computer readable medium of claim 14 further comprising:

program code for associating the animated image with the storage resource of a storage system that stores the group of images; and program code for enabling play back of the animated image to provide an indication of the content stored in the storage resource.

16. The computer readable medium of claim 15 further comprising program code for configuring the animated image to sequentially display each image in the identified set of images, one after another over time, in a frame of a preview window associated with the storage resource when the storage resource is displayed on a display screen.

17. The computer readable medium of claim 15 further comprising program code for configuring the animated image to repeatedly sequence through a temporary display of each image in the set of images in a preview window associated with the storage resource to provide a visual indication of the available content stored in the storage resource.

18. The computer readable medium of claim 14, wherein a frame of the animated image comprises a plurality of the images.

* * * * *